US008217252B2

(12) United States Patent
Bastian

(10) Patent No.: US 8,217,252 B2
(45) Date of Patent: *Jul. 10, 2012

(54) SYSTEM AND METHOD FOR CONTROLLING PLAY OF DIGITAL AUDIO EQUIPMENT

(75) Inventor: Mark-Jan Bastian, Amstelveen (NL)

(73) Assignee: N2IT Holding B.V., Schoonhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,112

(22) Filed: Jan. 16, 2012

(65) Prior Publication Data

US 2012/0111177 A1    May 10, 2012

Related U.S. Application Data

(60) Continuation of application No. 12/630,323, filed on Dec. 3, 2009, now Pat. No. 8,097,800, which is a continuation of application No. 11/773,195, filed on Jul. 3, 2007, now abandoned, which is a continuation of application No. 11/355,851, filed on Feb. 15, 2006, now Pat. No. 7,238,874, which is a division of application No. 10/133,846, filed on Apr. 26, 2002, now Pat. No. 7,012,184, which is a continuation of application No. PCT/NL01/00055, filed on Jan. 26, 2001.

(30) Foreign Application Priority Data

Feb. 29, 2000    (NL) ..................................... 1014526

(51) Int. Cl.
*G10H 7/00*    (2006.01)

(52) U.S. Cl. ............................................ 84/612; 369/9

(58) Field of Classification Search .................... 84/612, 84/645; 369/9, 69, 70
See application file for complete search history.

(56) References Cited

U.S. PATENT DOCUMENTS

| 3,755,792 A | 8/1973 | Harvey |
| 4,173,164 A | 11/1979 | Adachi et al. |
| 4,176,328 A | 11/1979 | Brown et al. |
| 4,300,225 A | 11/1981 | Lambl |
| 4,363,048 A | 12/1982 | Tanaka et al. |
| 4,901,300 A | 2/1990 | Van Der Zande et al. |
| 5,185,805 A | 2/1993 | Chiang |
| 5,297,167 A | 3/1994 | Buzbee et al. |

(Continued)

FOREIGN PATENT DOCUMENTS

EP    0871173    10/1998

(Continued)

OTHER PUBLICATIONS

Acquaviva, Giovanni , "Declaration of Giovanni Acquaviva, Managing Director N2IT Holding B.V. (Jun. 14, 2007)", Testimony and Exhibits 1-15 in Support of Motion for Preliminary Injunction, *N2IT Holding B.V. v. Native Intruments North America, Inc.*, Jul. 16, 2007.

(Continued)

*Primary Examiner* — Jeffrey Donels
(74) *Attorney, Agent, or Firm* — Jeffrey D. Myers; William N. Hughet; Peacock Myers, P.C.

(57) ABSTRACT

An apparatus for signal processing, wherein a disc is placed on a turntable and is provided with a groove which can be followed by the pick-up element, and employing a time-code signal wherein during use of the disc the said time-code signal controls the digital audio source.

26 Claims, 3 Drawing Sheets

U.S. PATENT DOCUMENTS

| | | | |
|---|---|---|---|
| 5,339,301 | A | 8/1994 | Raaymakers et al. |
| 5,345,244 | A | 9/1994 | Gildea et al. |
| 5,350,882 | A | 9/1994 | Koguchi et al. |
| 5,353,275 | A | 10/1994 | Almonte |
| 5,512,704 | A | 4/1996 | Adachi |
| 5,572,201 | A | 11/1996 | Graham et al. |
| 5,862,106 | A | 1/1999 | Washikawa et al. |
| 6,541,690 | B1 | 4/2003 | Segers, Jr. |
| 6,576,825 | B2 | 6/2003 | Yamada et al. |
| 6,818,815 | B2 | 11/2004 | Cohen |
| 7,012,184 | B2 | 3/2006 | Bastian |
| 7,041,892 | B2 | 5/2006 | Becker |
| 7,146,011 | B2 | 12/2006 | Yang et al. |
| 7,184,654 | B2 | 2/2007 | Kanamori et al. |
| 7,235,732 | B2 | 6/2007 | Becker |
| 7,238,874 | B2 | 7/2007 | Bastian |
| 7,615,702 | B2 | 11/2009 | Becker et al. |
| 7,683,249 | B2 | 3/2010 | Becker |
| 2003/0029305 | A1 | 2/2003 | Kent et al. |
| 2003/0185405 | A1 | 10/2003 | Spencer et al. |
| 2005/0081699 | A1 | 4/2005 | Becker |
| 2005/0152236 | A1 | 7/2005 | Wardle |
| 2006/0165392 | A1 | 7/2006 | Kanamori et al. |
| 2008/0063214 | A1 | 3/2008 | Spencer et al. |
| 2009/0116660 | A1 | 5/2009 | Croft et al. |

FOREIGN PATENT DOCUMENTS

| | | |
|---|---|---|
| WO | WO-97/01168 | 1/1997 |
| WO | WO-01/65559 | 9/2001 |

OTHER PUBLICATIONS

Avenell, Simon , "eDucation: some of the economics of eCommerce and the future of Higher Education", Apple University Consortium e-Xplore 2001, Sep. 23, 2001, 1-1 to 1-11.

Bauer, Chris , "Remixing Reality—the role of new interfaces and the politics of techno-utopianism", MA Digital Arts Thesis, Middlesex University, 1998.

Bauer, Chris , "The Spacedeck Project", spacedeck project website, Nov. 16, 2001.

Blum, Stanton , "Stanton Finalscrtach 2", REMIX Magazine, May 1, 2005.

Boswell, Rod , "The Wedge Virtual Reality Theatre", Apple University Consortium e-Xplore 2001, Sep. 23, 2001, 2-1 to 2-6.

Crean, David , "QuickTime streaming: a gateway to multi-modal social analyses", Apple University Consortium e-Xplore 2001, Sep. 23, 2001.

Dodds, Alan , "High Tech, High Touch—Education at a Distance", Apple University Consortium e-Xplore 2001, Sep. 23, 2001.

Dunbar, Andrew et al., "JoePM: Implementing a Collaborative Environment for Learning Multimedia Project Management", Apple University Consortium e-Xplore 2001, Sep. 23, 2001, 5-1 to 5-8.

EPO Appeal, , "Applicant's Brief for Grounds for Appeal (Jan. 7, 2005)", Filed in EPO Serial No. 01908437.7 on Oct. 6, 2004.

EPO Appeal, , "Applicant's Response to Technical Board of Appeal Preliminary Opinion", Proceeding regarding EPO Serial No. 01908437.5, Oct. 10, 2005.

EPO Appeal, "EPO Appeal Board Copies of Oral Proceedings", EP 1 908437, Nov. 18, 2005.

EPO Appeal, "EPO Appeal Board Decision", EP 1 908 437, Dec. 23, 2005.

EPO Appeal, "EPO Communication Rule 51(6) EPC Allowance following Board Decision", EP 1 908 437, Jan. 25, 2006.

EPO Appeal, "Opposition-Observations by Third Party (Dec. 3, 2003)- Applicant Response (Apr. 9, 2004)", EP 01 908 437.5, Dec. 23, 2005.

EPO Appeal, "Request Reconsideration and Notice of Appeal of EPO Examiner's Refusal to Allow", EP 1-908 437, Aug. 5, 2004.

Final Scratch, "What is Final Scratch", HTTP://WWW. FINALSCRATCH.com/fs4/load.asp?db=FS_MAC&sub=start.

Finalscratch Club Network, "Play Digital .. The Analog Way", FinalScratch Club Network web site, www.fianlscratch.com FS—MAC, Sep. 7, 2004.

Gardner, William G. et al., "Spectral Correlation of Modulated Signals: Part II-Digital Modulation", IEEE Transactions on Communications, vol. COM-35, No. 6, Jun. 6, 1987, 595-601.

Hacker, Scott et al., "Finalscratch", "The BeOS Bible", published by Peachpit Press, Copyright 1999, 1999, 751.

Hogg, Suzanne , "Sound in Educational Presentations the Tantalising, Terrifying, Too-Often-Forgotte Tool", Apple University Consortium e-Xplore 2001, Sep. 23, 2001, 6-1 to 6-6.

Inque, T. et al., "A Disrete Four-Channel Disc and Its Reproducing System (CD-4 System)", Journal of Audio Engineering Society, Mar. 25, 1971, 162-169.

Jackson, Charles , "Declaration of Dr. Charles L. Jackson (Jun. 15, 2007)", Experts Testimony, USDC Central District of California, *N2IT Holding B.V. v. Native Intruments North America, Inc.*, Jul. 16, 2007.

Kemm, Robert E. et al., "Collaborative Learning: on-campus in a Technololgy Based Environment", Apple University Consortium e-Xplore.2001, Sep. 23, 2001, 7-1 to 7-14.

Kirn, Peter , "NI Ends Legal Dispute Over Traktor Scratch; Digital Vinyl's Twisty, Turny History", CreateDigitalMusic.com, Apr. 28, 2008.

Lai, Bing-Chang et al., "Developing a Java API for Digital Video Control Using the Firewire SDK", Apple University Consortium e-Xplore 2001, Sep. 23, 2001, 9-1 to 9-9.

Lai, Bing-Chang et al., "Programming the Velocity Engine", Apple University Consortium e-Xplore 2001, Sep. 23, 2001, 8-1 to 8-14.

Lowe, Richard , "Beyond "eye candy": Improving Learning with Animations", Apple University Consortium e-Xplore 2001, Sep. 23, 2001, 10-1 to 10-9.

Luca, Joe et al., "Designing and On-Line Learning Environment to Support the Development of Generic Skills: a case study", Apple University Consortium e-Xplore 2001, Sep. 23, 2001, 11-1 to 11-8.

Ludewig, Alexandra , "iMovie. A Student Project with Many Side-Effects", Apple University Consortium e-Xplore 2001, Sep. 23, 2001, 12-1-12-11.

M-Audio, "Defendant's First Amended Answer", USDC-Virginia; 2:08-cv-00619, Oct. 9, 2009.

M-Audio, , "Defendant's Notice Under 35 USC 282", USDC-Virginia; 2:08-cv-00619, Nov. 13, 2009.

M-Audio, , "Defendant's Responses to First Set of Interrogatories", USDC-Virginia; 2:08-cv-00619, Jun. 29, 2009.

M-Audio, , "Defendant's Second Set of Supplemental Responses to First Set of Interrogatories", USDC Virginia 2:08-cv-00619, Aug. 13, 2009.

M-Audio, , "Defendant's Supplemental Responses to First Set of Interrogatories", USDC-Virginia; 2:08-cv-00619, Jul. 15, 2009.

M-Audio, "Defendant's Third Set of Supplemental Responses to First Set of Interrogatories", USDC-Virginia 2:08-cv-00619, Aug. 13, 2009.

M-Audio, , "Inital Expert Report of Thaddeus Fletcher", USDC-Virginia; 2:08-cv-00619, Sep. 24, 2009.

M-Audio, , "Plaintiff N2IT Holding's Objections and Responses to Defendant M-Audio's First Request for Admissions", USDC-Virginia; 2:08-cv-00619, Nov. 2, 2009.

M-Audio,—Russell J. , "Compact Disc Playback Unit with Advanced Variable Speed Control", Discovery Disclosure Unpublished Post Graduate Project Record of Structure, Implementation & Development; Computer Science Department, Univ. Auckland, New Zealand, Jan. 10, 1996,1-50.

McLoughlin, Catherine , "An E-Learning Solution to Creating Work-Related Skills and Comp;etencies for the Kowlede-based Community", Apple University Consortium e-Xplore 2001, Sep. 23, 2001, 14-1 to 14-13.

McLoughlin, Catherine , "Technological Tools for Visual Thinking: What Does the Research Tell Us?", Apple University Consortium e-Xplore 2001, Sep. 23, 2001,13-1 to 13-12.

McMahon, Mark , "Choreograph3D: Collaborative Innovation Through Dance and Multimedia", Apple University Consortium e-Xplore 2001, Sep. 23, 2001,15-1 to 15-8.

Moore, Ross et al., "MacQTEX: Self-Testing Quizzes, Using PDF", Apple University Consortium e-Xplore 2001, Sep. 23, 2001, 16-1 to 16-14.

N2IT, , "Digital Audio DJ Mixing Software for BeOS", New Harmony Central News, Nov. 19, 1998.

Obrien, William , "Plaintiff N2IT Holding Notice of Motion and Motion for Preliminary Injunction (Jun. 20, 2007)", USDC Central California, N2IT Holding B.V. v. Native Instruments North America, Inc., Jun. 20, 2007.

Pagram, Jeremy , "The Apple is Ripe, But the Connection Gives Us the PIP!", Apple University Consortium e-Xplore 2001, Sep. 23, 2001, 17-1 to 17-5.

Parkinson, Alan et al., "Decoupling the WebObjects Applications from the EOModel—a case study in OO Design", Apple University Consortium e-Xplore 2001, Sep. 23, 2001, 18-1 to 18-6.

Pearce, Jon , "Motion Workshop: Tracking Motion in an On-Line Environment", Apple University Consortium e-Xplore 2001, Sep. 23, 2001, 19-1 to 19-6.

Phillips, Rob et al., "The Use of QTVR for Teaching Radiology and Diagnostic Imaging", Apple University Consortium e-Xplore 2001, Sep. 23, 2001, 20-1 to 20-8.

Radcliff, John , "Time Code A User's Guide", Oxford-Focal Press, 3rd. ED., Jun. 1999.

Rathinavelu, A. et al., "e-Learning for Hearing Impaired Students", Apple University Consortium e-Xplore 2001, Sep. 23, 2001, 21-1 to 21-6.

Rees, Philip , "Synchronisation and SMPTE timecode (time code)", www.philrees.co.uk/articles/timecode.htm, Oct. 29, 2003.

Rowland, Gregg et al., "Exploring On-Line Learning Communities-:Supporting Physical and Health Education Professional Development Opportunities", Apple University Consortium e-Xplore 2001, Sep. 23, 2001, 22-1 to 22-7.

Ruberu, Dhammika , "Developing a Multimedia Engine in QuickTime for Java", Apple University Consortium e-Xplore 2001, Sep. 23, 2001, 23-1 to 23-9.

Segrave, Stephen , "QuickTime Multi-Track Theatricks", Apple University Consortium e-Xplore 2001, Sep. 23, 2001, 24-1 to 24-14.

Smythe, Neville , "e-Xplore 2001: a face-toface odyssey", Apple University Consortium Academic and Developers Conference, Sep. 23, 2001.

Voges, Kevin E. et al., "Computational Marketing Using an AppleSeed Cluster", Apple University Consortium e-Xplore 2001, Sep. 23, 2001, 25-1 to 25-11.

SYSTEM AND METHOD FOR CONTROLLING PLAY OF DIGITAL AUDIO EQUIPMENT

CROSS-REFERENCE TO RELATED APPLICATIONS

This application is a continuation application of U.S. patent application Ser. No. 12/630,323, entitled "Method for Signal Processing and an Apparatus Therefore", filed on Dec. 3, 2009 and issued as U.S. Pat. No. 8,097,800 on Jan. 17, 2012, which is a continuation application of U.S. patent application Ser. No. 11/773,195, entitled "Method for Signal Processing and an Apparatus Therefore", filed on Jul. 3, 2007 which is a continuation application of U.S. patent application Ser. No. 11/355,851, entitled "Disc For Use In An Apparatus For Signal Processing, And Such An Apparatus", filed on Feb. 15, 2006, which is U.S. Pat. No. 7,238,874 issued on Jul. 3, 2007, which is a divisional application of patent application Ser. No. 10/133,846, entitled "Disc For Use In An Apparatus For Signal Processing, And Such An Apparatus", filed on Apr. 26, 2002, which is U.S. Pat. No. 7,012,184 issued on Mar. 14, 2006, which is a Continuation of International Application Number PCT/NL01/00055 filed on Jan. 26, 2001 entitled "Disc For Use In An Apparatus For Signal Processing, And Such An Apparatus", which is a continuation and claims priority to The Netherlands application number NL 1014526, entitled "Disc For Use In An Apparatus For Signal Processing, And Such An Apparatus", filed Feb. 29, 2000. The specifications and claims thereof are incorporated herein by reference.

STATEMENT REGARDING FEDERALLY SPONSORED RESEARCH OR DEVELOPMENT

Not Applicable

INTRODUCTION

The invention primarily relates to a disc for use in an apparatus for signal processing. Further, the invention relates to such an apparatus for signal processing.

BACKGROUND OF THE INVENTION

From WO 97/01168, a system is known for the digital processing of audio signals which is particularly suitable for disc jockeys and scratch artists. The speed and direction of a digital audio signal, for instance derived from a CD player, can be controlled according to this citation by the manual control of a rotational element. This rotational element is placed for instance on a turntable of a conventional record player and is being read by means of an optical sensor determining the speed and direction of rotation of the turntable. The data that are obtained thereby are being used to control the speed and direction of reproduction of the CD player. The problem associated with this known apparatus is, however, that it is hardly usable by disc jockeys and in scratch applications for the reason that from a given position of the reading head of the CD player only continuously developing relative movements are possible that depend on the control of the earlier mentioned rotational element. In the known apparatus, it is for instance not possible to make swift reproductions of different musical segments on the CD in a way that is reproducible and can be controlled satisfactorily. Also the authentic scratch sound which can be realized by means of a conventional record, cannot be obtained with the known apparatus.

SUMMARY OF THE INVENTION

With the invention it is intended to improve this and to provide a system which allows to provide a sound impression with a digital sound source which conforms to the possibilities that exist with conventional records, and with which quickly digitally recorded (musical) fragments can be located.

In a first aspect of the invention, a disc is proposed therefore which is designed for use in such an apparatus for signal processing, such that the disc during its use is placed on the turntable and is provided with a groove which can be followed by the pick-up element, and which comprises a time-code signal wherein during use of the disc the said time-code signal controls the digital audio source.

A practical embodiment of the disc is characterized in that the time-code signal is an absolute time-code signal that is comprised in the groove in a predetermined number subsequently arranged discrete steps. It is advisable to select the number of discrete steps in such way that the resolution is sufficiently high to realize the intended effect. In practice this means that the number of discrete steps may count five per second.

From a view point of cost efficiency and also to make a natural connection to the known scratching techniques with conventional records, it is desirable that the time-code signal is modulated on a carrier frequency in the audible range between 20 and 20,000 Hz. In this way, it is possible to simply use normal audio equipment for playing the disc.

In a further aspect of the invention, the apparatus for signal processing is so equipped that the pick-up element feeds a digital filter which has a phase-locked loop circuit for detecting and following a carrier frequency, and a demodulation circuit for demodulating the time-code signal that is modulated on the carrier frequency. The disc and the apparatus for signal processing can then cooperate such that the absolute time-code signal that is present on the disc, provides the control for the digital audio source.

It is further advantageous that the groove of the disc comprises a time-code signal in both the left and the right channel, which are mutually shifted in phase. In this way, a quick determination of the direction in respect of the rotation of the disc can be extracted.

Appropriately then the apparatus is equipped with a detection device for determining a phase difference between the time-code signal demodulated from the left and the right signal, respectively. In this way, the desired direction of play of the digital audio equipment can be determined already when the needle is lowered onto the disc according to the invention without noticeable delay, enhancing the impression that one is working with an entirely conventional analogue audio installation.

A suitable embodiment of the apparatus is characterized in that it comprises a digital audio buffer being under control of the time-code signal, and that the digital audio buffer is connected to a digital output filter which feeds a signal output which is selected from the group formed by a digital electric output socket, a digital optic signal output, and a D/A converter.

The scratch effect can be manufactured in such an apparatus particularly adequately when it comprises control logic being fed by the time-code signal for determining a velocity signal being a measure for the speed of change of the timecode signal, and that the digital output filter is being controlled by the said control logic.

BRIEF DESCRIPTION OF THE DRAWINGS

The invention will now be further elucidated in respect of a non-limiting embodiment explaining the disc and its use in an apparatus according to the invention in a schematic diagram.

DETAILED DESCRIPTION OF THE INVENTION

Figure 1:
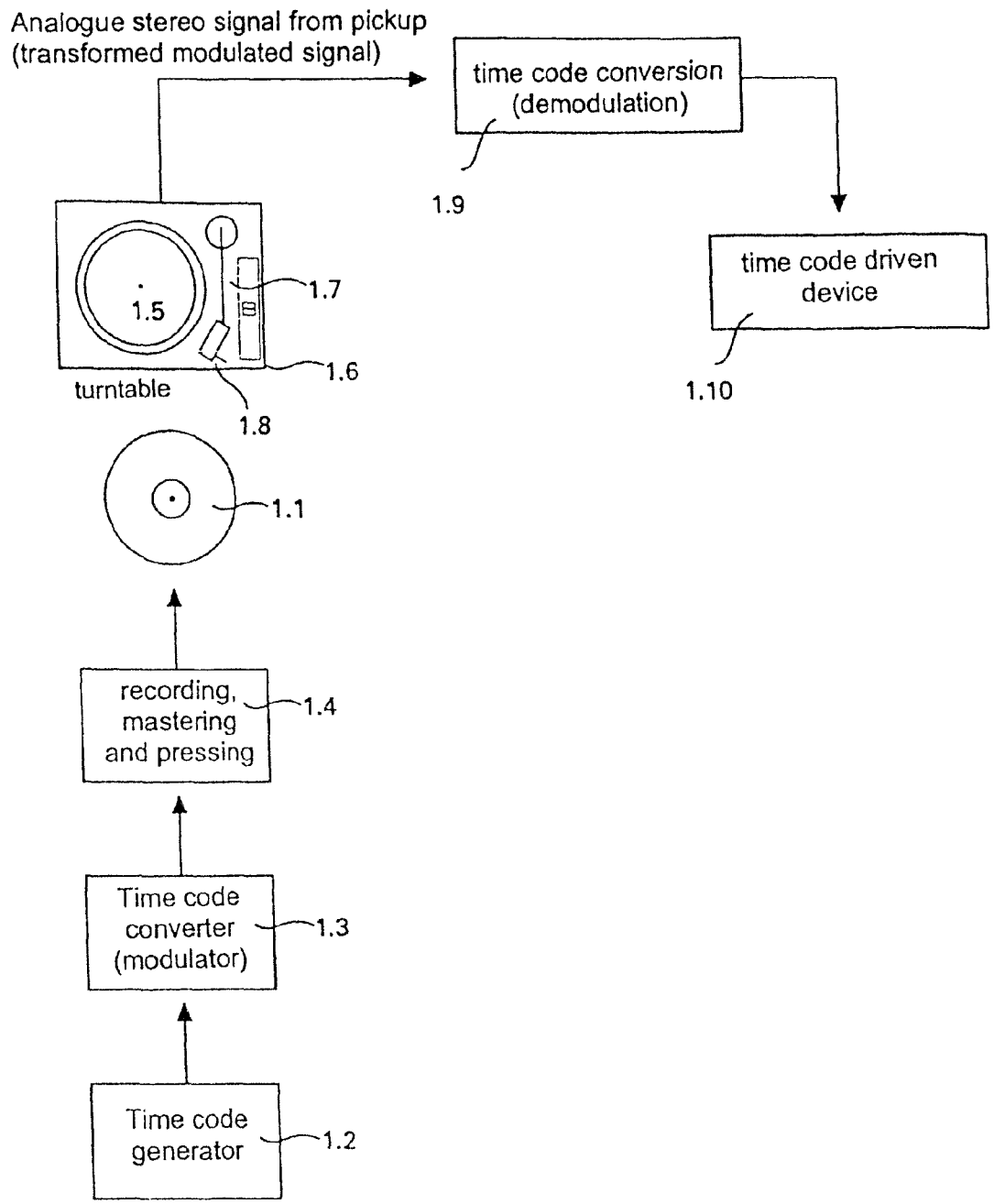
FIG. 1 shows schematically the apparatus for signal processing according to according to one embodiment of the present invention and the disc to be used thereby.

FIG. 1 shows a disc 1.1 which is manufactured according to known manufacturing techniques that have been in use for many years now in the manufacture of conventional records. The disc 1.1 is provided with an absolute time-code signal by making use of a time-code generator 1.2 controlling a modulator 1.3 which supplies a carrier frequency modulated by the time-code generator 1.2 and which is applied to the disc 1.1 as the only signal. Block 1.4 shows the conventional manufacturing method of recording, making of the master disc, and pressing the final vinyl disc 1.1. The disc 1.1 can be placed on a turntable 1.5 of a record player 1.6, which is further provided with an arm 1.7 and a pick-up element 1.8.

The pick-up element 1.8 can follow the groove in the disc 1.1 that comprises the absolute time-code signal, and the pick-up element 1.8 is connected to the apparatus part 1.9 for demodulating the carrier signal in order to provide the (digital) time-code signal, which serves for the control of the digital audio source 1.10, for instance a CD player, a DVD player, an MP3 reproduction device, or the like.

Figure 2:
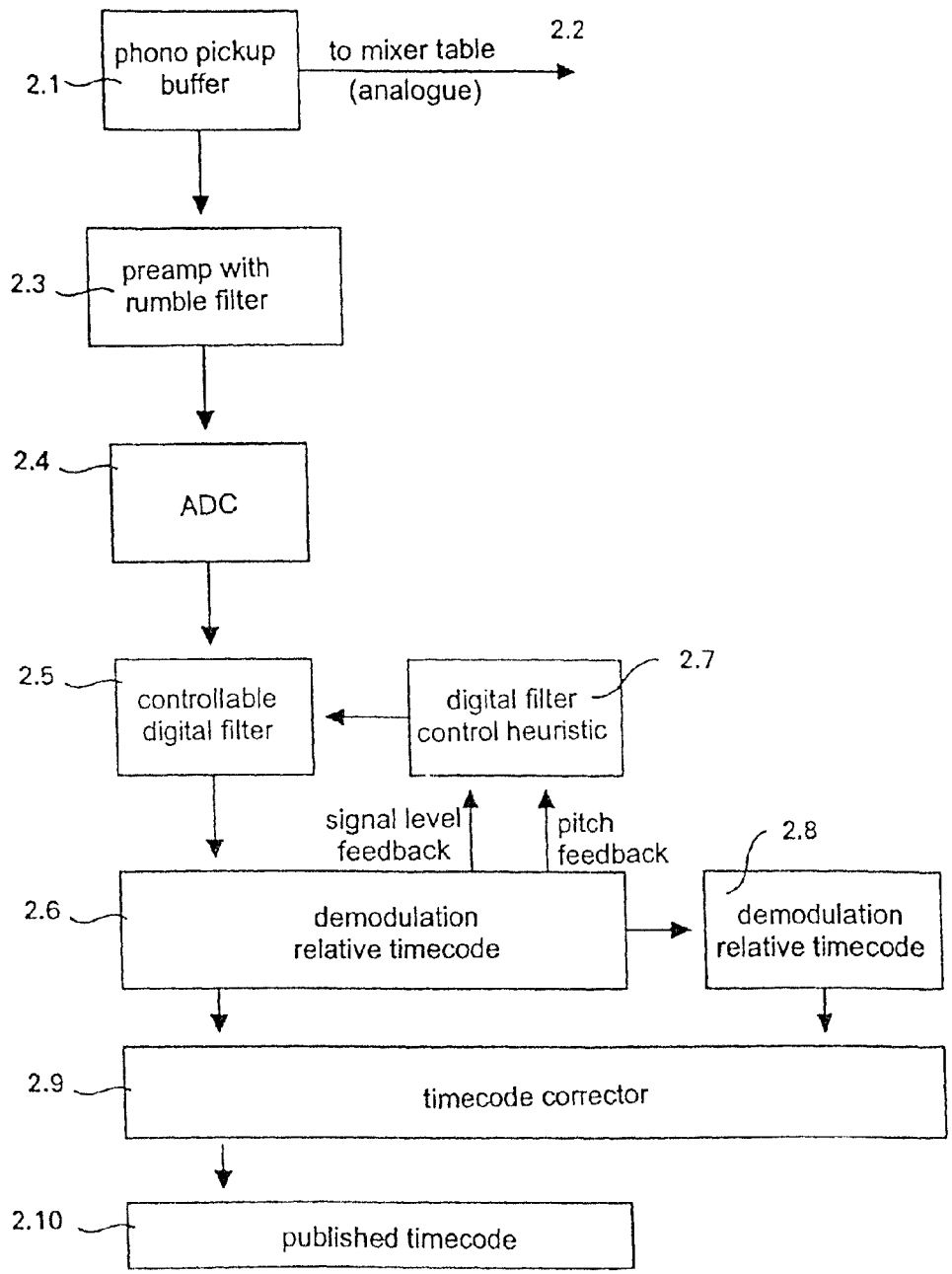
FIG. 2 show as block diagrams the signal processing applied in the apparatus according to one embodiment of the present invention.
Figure 3:
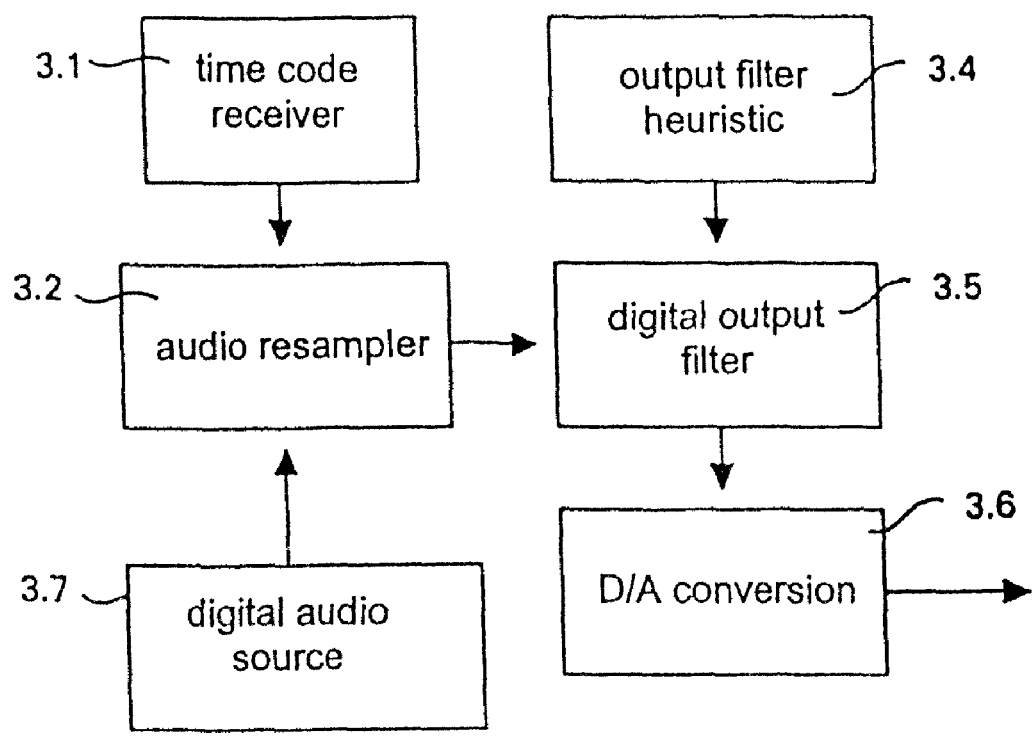
FIG. 3 then show as block diagrams the signal processing applied in the apparatus according to according to one embodiment of the present invention the invention.

The operation of the apparatus part 1.9 according to FIG. 1 will hereafter be further elucidated with reference to FIG. 2. The operation of the digital audio source 1.10 which stands under control of the time-code signal will hereafter be further elucidated with reference to FIG. 3.

Referring now first to FIG. 2, it is shown that the signal that is derived from the pick-up element 1.8 according to FIG. 1, is fed to a input buffer 2.1 from which a signal may be finally led to a mixing table 2.2 in order to provide for the situation that the turntable 1.5 according to FIG. 1 carries a conventional analogue vinyl record. The just-mentioned input buffer 2.1 feeds a preamplifier 2.3, provided with a low rejector circuit, and which feeds in turn an analogue/digital converter 2.4, for instance a 16-bit or 20-bit converter, depending on the desired resolution. The reference numerals 2.5, 2.6 and 2.7 refer to a digital filter, the operation of which depends on, inter alia, the speed of movement of the disc 1.1 according to FIG. 1 vis-a-vis the pick-up element 1.8. The apparatus part 2.7 of FIG. 2 may comprise a phase-locked loop circuit for detecting and following the carrier frequency which is provided on the disc 1.1 according to FIG. 1. In the current implementation, however, use is made of a moving average filter supplemented with detection means for detecting a stand-still of the disc 1.1. Furthermore, demodulation takes place in the circuit of apparatus part 2.6 for demodulating the time-code signal that is modulated on the carrier frequency. Although the above subject matter is shown and explained as the signal in a single channel, it is preferable according to the invention that a left and a right channel is present, and that the detection apparatus which forms part of the digital filter 2.5, 2.6, 2.7 is made in duplicate so as to allow a phase difference between the left and the right channel carrying the demodulated time-code signal to be determined. In this manner, the correct place and direction of movement of the disc 1.1 in relation to the pick-up element 1.8 according to FIG. 1 can be determined with high resolution.

The phase difference between the left and right channel is useful to extract the directional information very quickly when the pick-up element 1.8 is suddenly lowered onto the rotating disc 1.1. The absolute time-code which is determined from the carrier frequency is subsequently used together with the relative time-code, which is based on the difference between the left and the right channel, to determine an accurate time-code signal 2.10 which serves to control the digital audio source 1.10 as shown in FIG. 1. The time-code signal 2.10 of FIG. 2 is therefore read into apparatus part 3.1 (see FIG. 3) of the digital audio source, wherein same provides a direct control of a digital audio reader 3.2 reading the desired digital information from the correct place of for instance a CD disc. This digital audio information is being transferred from apparatus part 3.2 to a digital output filter 3.5 which is being controlled by control logic 3.4, and which determines from the time-code signal which is read into apparatus part 3.1, the speed of change of the time-code signal. This speed of change signal which is derived from the time-code signal, determines the parameters of the digital output filter 3.5. In a manner known to the expert, the digital output filter 3.5 can then feed a digital electric output socket, a digital optical signal output, or a D/A converter. This last provision is shown in the Figure with reference numeral 3.6.

The present invention has been described in terms of preferred embodiments, however, it will be appreciated that various modifications and improvements may be made to the described embodiments without departing from the scope of the invention.

What is claimed is:

1. A system for controlling play of digital audio equipment, the system comprising:
 a disc including a control signal indicative of speed of disc play, directionality of disc play, and place on the disc of play,
 wherein the disc includes a carrier frequency in the audible range between 20 and 20,000 Hz with an absolute control signal indicative of position of play on the disc;
 a digital filter processing the control signal to determine a relative control signal based on the difference between a left and right channel of the control signal,
 wherein the relative control signal indicates directionality of disc movement; and
 an output filter utilizing the absolute control signal and the relative control signal to determine an accurate control signal serving to control play of the digital audio equipment.

2. The system according to claim 1, wherein controlling play of the digital audio equipment includes controlling the speed of play of the digital audio equipment.

3. The system according to claim 1, wherein controlling play of the digital audio equipment includes controlling the direction of play of the digital audio equipment.

4. The system according to claim 1, wherein play of the digital audio equipment comprises the play of music.

5. The system according to claim 1, wherein play of the digital audio equipment includes producing, without noticeable delay, a scratch sound effect based on the speed and direction of play of the disc.

6. The system according to claim 1, wherein the digital audio equipment comprises a CD player, a DVD player, or an MP3 player.

7. A method for controlling play of digital audio equipment, the method comprising:
processing a disc on a turntable, wherein the disc comprises an absolute control signal and a carrier frequency;
deriving the absolute control signal from the carrier frequency, wherein the absolute control signal comprises at least one of a right channel and a left channel, and wherein the carrier frequency is in the audible range between 20 and 20,000 Hz;
determining a relative control signal by detecting a phase difference between the right channel and the left channel, wherein the relative control signal is determinative of the direction of movement of the disc;
utilizing the absolute control signal together with the relative control signal to determine an accurate control signal; and
utilizing the accurate control signal to control play of digital audio equipment.

8. The method according to claim 7, wherein controlling play of the digital audio equipment includes controlling the speed of play of the digital audio equipment.

9. The method according to claim 7, wherein controlling play of the digital audio equipment includes controlling the direction of play of the digital audio equipment.

10. The method according to claim 7, including producing a scratch sound effect with the controlled digital audio equipment.

11. The method according to claim 7, wherein the absolute control signal is indicative of position of play on the disc.

12. The method according to claim 7, wherein the play of the digital audio equipment comprises the play of music.

13. The method according to claim 7, further comprising detecting a stand-still of the disc.

14. A method for play of sound from an audio source, comprising:
processing a disc rotationally on a turntable, wherein the disc comprises an absolute time-code signal;
deriving the absolute time-code signal from a carrier frequency, wherein the derived time-code signal comprises at least one of a right channel and a left channel;
determining a relative time-code signal by detecting a phase difference between the right channel and the left channel, wherein the relative time-code signal is determinative of the direction of movement of the disc;
utilizing the absolute time-code signal together with the relative time-code signal to determine an accurate time-code signal; and
utilizing the accurate time-code signal to control play of sound from an audio source.

15. The method according to claim 14, wherein the play of sound from the audio source comprises the play of music.

16. The method according to claim 14, wherein the accurate time-code signal controls one or more of speed of audio source play, directionality of audio source play, and place of play on the audio source.

17. The method according to claim 14, wherein play of sound includes producing a scratch sound effect based on the speed and direction of play of the disc.

18. A system for controlling a digital audio source, comprising:
a turntable;
a disc comprising time-code signals,
wherein the time-code signals include absolute time-code signals carried in the audible range of 20 to 20,000 Hz;
a pick-up element deriving the time-code signals from the disc while the disc is rotating on the turntable;
a filter determining accurate time-code signals from the derived time-code signals; and
a receiver using the accurate time-code signals to control a digital audio source.

19. The system according to claim 18, wherein a relative time-code is determined based on a phase difference between right and left channels of the derived time-code signals, and wherein the relative time-code is used to control the direction of the digital audio source.

20. The system according to claim 19, wherein the accurate time-code signals are determined from the absolute time-code signals and the relative time-code signals.

21. The system according to claim 18, wherein at least the direction and speed of the digital audio source is controlled with the accurate time-code signals.

22. The system according to claim 18, wherein control of the digital audio source comprises the play of music.

23. The system according to claim 18, wherein control of the digital audio source includes producing a scratch sound effect based on the speed and direction of play of the disc.

24. The system according to claim 18, wherein the accurate time-code signals control one or more of speed of digital audio source play, directionality of digital audio source play, and place of play on the digital audio source.

25. The system according to claim 18, wherein control of the digital audio source includes detecting a stand-still of the disc.

26. The system according to claim 18, wherein the digital audio source comprises a CD player, a DVD player, or an MP3 player.

* * * * *